Patented Jan. 30, 1923.

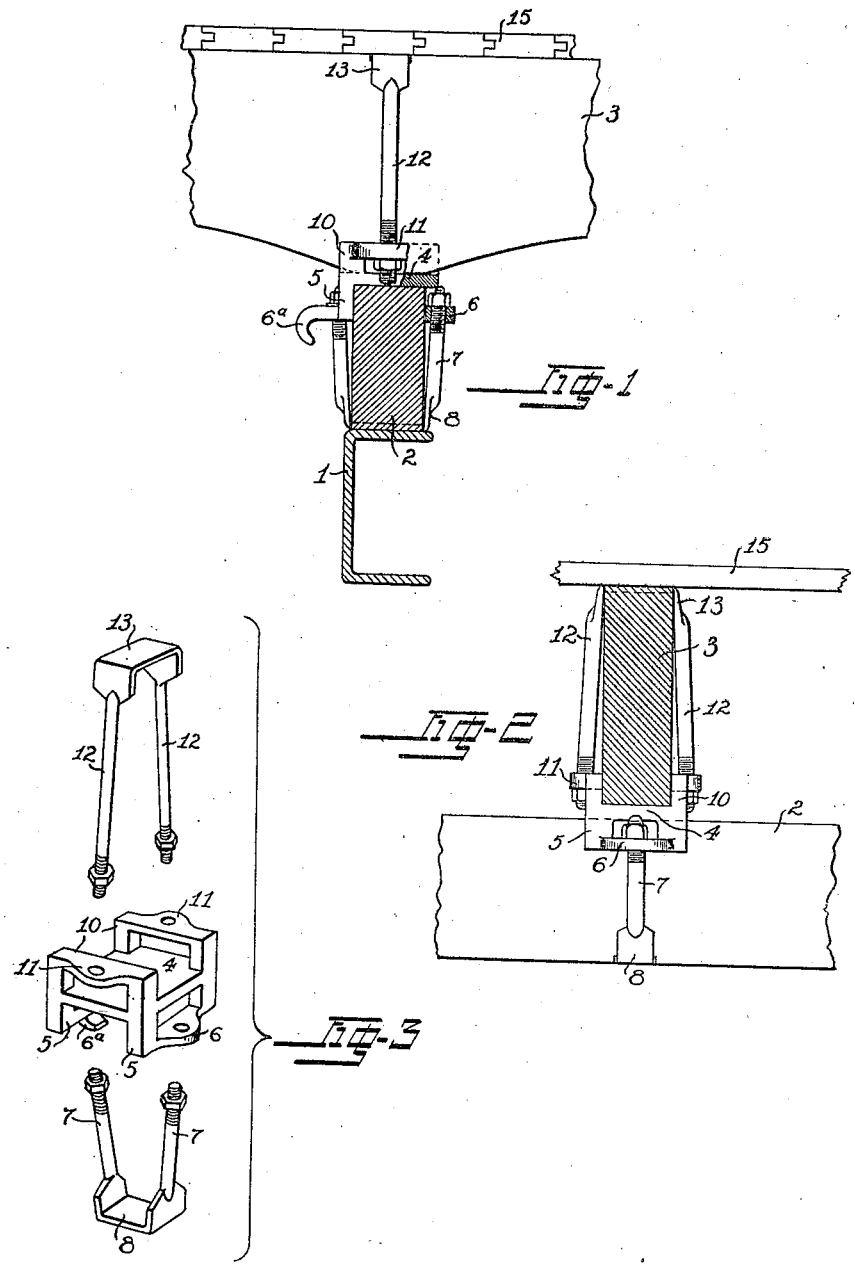

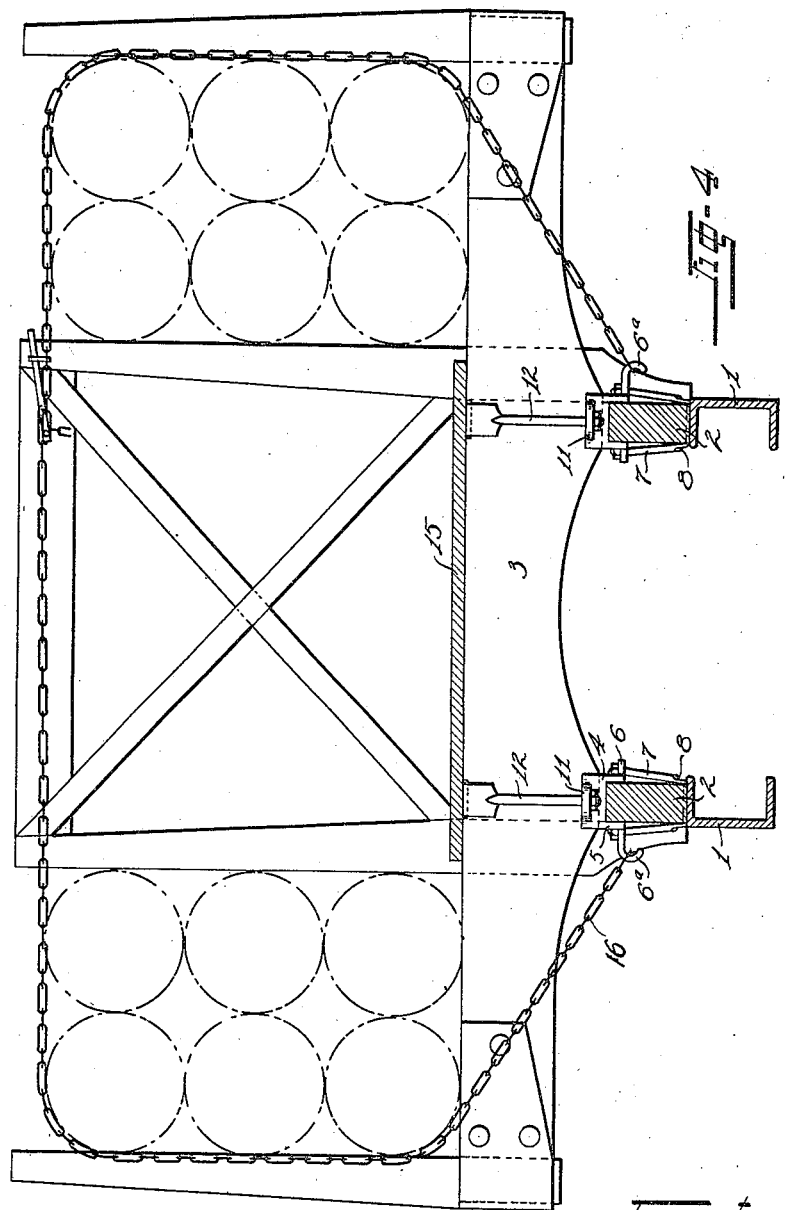

1,443,818

UNITED STATES PATENT OFFICE.

DEAN M. GILLESPIE, OF DENVER, COLORADO.

TRUCK-FRAME FASTENER.

Application filed July 19, 1920. Serial No. 397,340.

*To all whom it may concern:*

Be it known that I, DEAN M. GILLESPIE, a citizen of the United States, residing at Denver, in the county of Denver and State of Colorado, have invented a certain new and useful Improvement in Truck-Frame Fasteners, of which the following is a full, clear, and exact description, reference being had to the accompanying drawings.

This invention relates to truck and vehicle bodies, especially the bodies of automobile trucks, and has for its object the provision of a new and improved device and arrangement for fastening together the essential parts thereof so as to hold the same firmly and without rattling, and to permit the ready tightening of the parts whenever they become loosened by wear or shrinkage. Another object is the provision of a cheap, simple and convenient fastening device. which can be applied with a minimum of labor cost and without weakening the members of the body; while further objects and advantages of the invention will appear as the description proceeds.

In the drawings accompanying and forming a part of this application I have shown an illustrative embodiment of my invention as applied to an automobile truck wherein Fig. 1 represents a cross sectional view of a portion of an automobile chassis together with the essential body parts showing the use of my invention; Fig. 2 is a sectional view of the same parts taken at right angles to Fig. 1; Fig. 3 is a perspective view showing the metal parts in spaced relation; and Fig. 4 is a transverse sectional view of the body showing the manner in which chains are employed with my invention.

Describing the parts by reference characters 1 represents one of the longitudinal members of the chassis frame, 2 a longitudinal wooden sill laid thereon, and 3 a transverse bolster which crosses the sill. At the intersection of the bolster and sill I locate a saddle member, shown in Figs. 1, 2 and 3 as consisting of a plate 4 formed at one side with a pair of spaced side walls 5—5 provided with apertured ears 6, the ears being adapted for the reception of the legs 7—7 of a saddle bolt 8. From the opposite sides of the plate project the walls 10—10 which are arranged transversely of the walls 5—5 and are provided with the apertured ears 11—11 adapted for the reception of the legs 12 of the saddle bolt 13. This saddle member is interposed between the sill and bolster in such wise that the sides 5—5 will straddle the sill and the sides 10—10 receive the bolster, the saddle bolts being applied in an obvious manner. The ears 6 and 11 are directly opposite the frame members 3 and 2 respectively so that the pressure of the bolts produces no breaking strain, and are sufficiently spaced from those members to permit the insertion of the nuts and a wrench to tighten them. The floor boards 15 are applied and fastened in the usual way, and the sills are attached to the chassis in the usual manner.

I have also shown one of the ears 6 as extended and turned into a hook $6^a$ which is frequently very convenient for the purpose of attaching a chain, rope or cable, especially when the body is employed for carrying logs, casings, masts or other similar articles as described in my Patent No. 1,320,131, issued October 28, 1919.

It will be observed that the hook $6^a$ projects laterally outwardly from each saddle member, thus enabling the chain, rope or cable 16 to be attached to the saddle members in a very convenient manner, as indicated in Fig. 4. Furthermore the fact that each saddle member is connected to the bolster and to a longitudinal member results in distributing to the bolster from each longitudinal member the strain exerted by the load upon the chain. In ordinary practice, the chains are connected to the longitudinal sills or to the frame members 1. This however, frequently results in spreading these longitudinal members apart, a disadvantage which is entirely obviated by my construction.

It will be understood that numerous other changes in details and constructions can be made within the scope of the annexed claim, all of which I desire to secure by these Letters Patent in so far as they are distinct from the prior art.

Having thus described my invention, what I claim is:

In a vehicle body, the combination, with a pair of perpendicular frame members, of fastening means therefor, comprising a metal member having a flat plate and a pair of parallel walls projecting from each side thereof, the walls at one side being at right angles to those on the other side so as to define two perpendicular channels which open in opposite directions, each of said channels receiving one of said members, the extremity of each wall being formed with an out-turned ear spaced from the bottom of the opposite channel and having an aperture located between the planes which define the side walls of the opposite channel, saddle bolts embracing said members and having their legs projecting into the apertures of corresponding ears, and nuts on said legs between the ears and the surface of the other frame member.

In testimony whereof, I hereunto affix my signature.

DEAN M. GILLESPIE.